Jan. 8, 1929.

G. H. FAST 1,697,915

TRACTION DEVICE FOR AUTOMOBILES

Filed Nov. 8, 1923     2 Sheets-Sheet 1

INVENTOR
*G. H. Fast.*

BY *Ralph Burch*
his Attorney

Jan. 8, 1929.

G. H. FAST 1,697,915

TRACTION DEVICE FOR AUTOMOBILES

Filed Nov. 8, 1923

INVENTOR
G.H.Fast.
BY *Ralph Burch*
his Attorney.

Patented Jan. 8, 1929.

1,697,915

UNITED STATES PATENT OFFICE.

GERHARD HAROLD FAST, OF FIELDING, SASKATCHEWAN, CANADA.

TRACTION DEVICE FOR AUTOMOBILES.

Application filed November 8, 1923, Serial No. 673,497, and in Canada November 9, 1922.

The present invention relates to traction attachments for motor vehicles and the like; and more particularly appertains to improvements in that type of device adapted for connection to such vehicles whereby the same may be transformed for winter use.

The primary object of the invention is to provide a device adapted for actuation by the drive wheels of the vehicle and which, by the use of an endless belt and other attachments as hereinafter described presents a relatively large gripping surface and so obtains a maximum of driving traction in deep snowy roads.

Another object is to provide such a device adapted to be readily attached to the conventional motor car chassis and while relatively strong and substantial is capable of rapid attachment and readily accessible adjustments.

Another object of the invention is to provide, for use in connection with such a traction-driven vehicle, relatively wide front runners which will withstand running in loose snow, tending to harden the roads and will be capable of supporting the front part of the vehicle when same is caused to leave the beaten road.

Among the aims and objects of this invention may be cited the provision of a device in which the number of parts are few, the construction simple, and the cost of production low.

With these and other objects in view my invention resides in the construction, combination and arrangement of the various cooperating elements as shall be hereinafter more fully described, illustrated in the accompanying drawings and pointed out in the claim hereunto appended.

In the drawings forming part of this disclosure—

Figure 2:
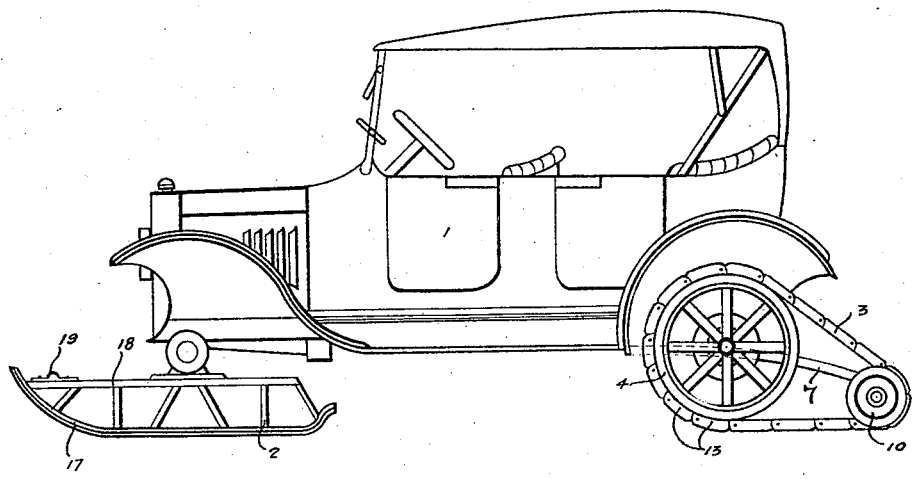
Figure 2 is an elevation of a conventional type of motor vehicle showing my device arranged in position.

In these drawings wherein like characters of reference designated like parts throughout the several views, the numeral 1 designated the motor vehicle and numeral 2 the front runners which replace the wheels, as will be seen in Figure 2, these runners are attached to the front axle spindles in substantially the same manner as the wheels they replace and are intended to support the front of the vehicle at approximately the same height as did the said wheels.

Figure 3:
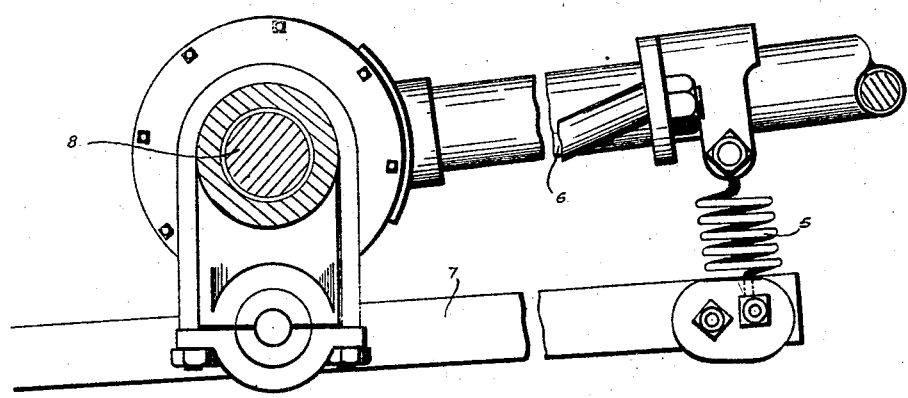
Figure 3 is a sectional-elevation illustrating the manner in which supports for the auxiliary rear axle are attached to the drive shaft and rear axle housings.

In the case of automobiles with detachable rims; when it is desired to attach the traction belts 3 the original rear rims and tires are removed and replaced with rims 4 of similar form but provided with sprocket-teeth arranged on the periphery. If the rims are not demountable it will be necessary to provide whole wheels especially adapted for the purpose. Engaging at its inner end, by a tension spring connection 5, with the driveshaft housing 6, preferably right behind the universal housing, is the resilient steel frame 7 which passes under, though hingedly connected to the rear axle 8, as illustrated in Figure 3, and supports the auxiliary axle 9 which carries on each end a traction-belt idler 10.

Figure 5:
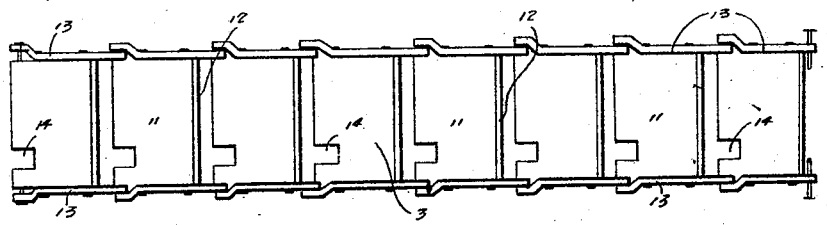
Figure 5 is a plan of a portion of one of the traction belts.
Figure 6:
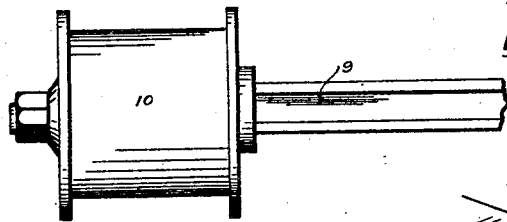
Figure 6 is an elevation of one of the traction belt-carrying idlers attached to the auxiliary axle.
Figure 4:
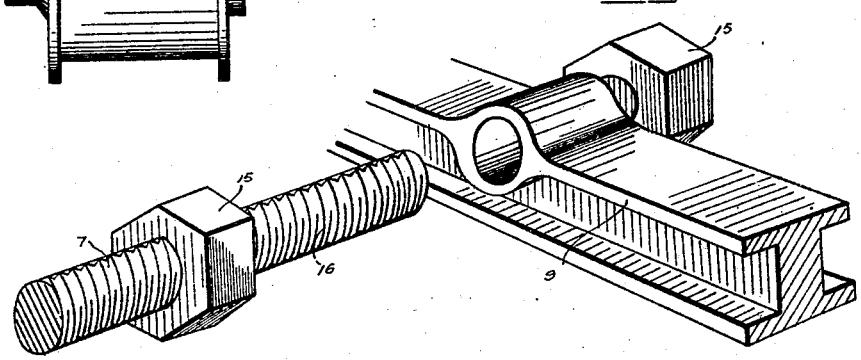
Figure 4 is a perspective view of a portion of the auxiliary axle and one arm of the support therefor; and a pair of nuts illustrating the means for connecting and regulating the position of the said auxiliary axle.

In attaching my device it is intended that the frame 7 be first arranged and to allow of the later positioning of the belt 3 it is necessary that this belt be provided with a loose link or some similar means of disconnection. This said belt 3, as illustrated in Figure 5, may be formed of blocks 11 faced on the sprocket-teeth engaging side, with metal plates 12 to guard against wear and connected in chain by steel links 13 on each side. To allow for the clearance of the engaging teeth, these blocks 11 may include the indentations 14 on the unprotected side. As will be obvious the belts 3 will require some means of adjustment and accordingly the connections of the frame 7 to the auxiliary axle 9, as illustrated in Figure 3, comprise a pair of nuts 15 adapted for engagement, one on either side of the said axle, with a threaded portion 16 on the ends of the arms of frame 7 so that when the belts require tightening or loosening the simple regulation of the nuts 15 is the only operation necessary.

Figure 1:
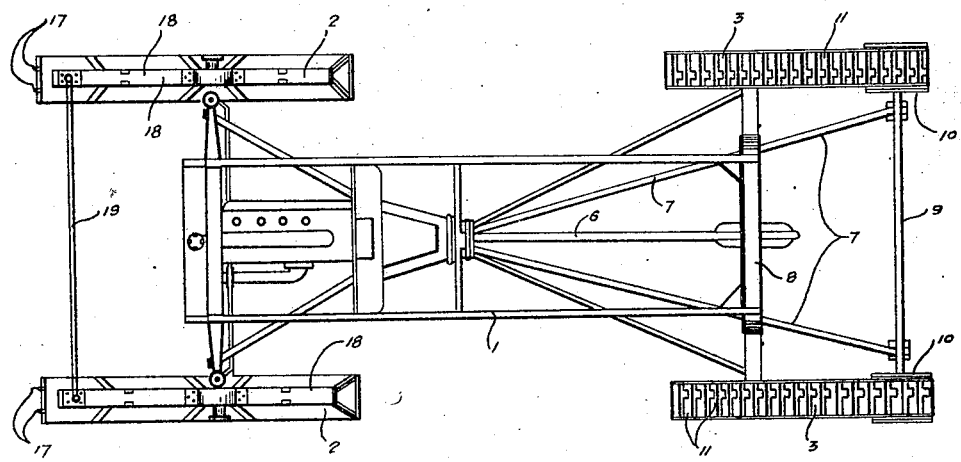
Figure 1 is a plan of a conventional chassis with my traction device and runner attachments in place.

Referring to Figures 1 and 2 it will be seen that the runners 2 are provided with metal rudders 17 and carry the decks 18 on the fronts of which are mounted the ball-and-socket joints of the stay 19.

From the foregoing description of the construction and means for tensionally connecting the frame 7 to the axle housing and carrying it under the rear axle to which it is hingedly connected it may appear as if this was merely to hold the belt 3, passing around the idlers 10, on the ground but an equally important function is to allow for "give" when the rear drive wheels are passing over a depression in the road as this spring construction does not suspend the said wheels in the air but allows the encircling belt to retain constant engagement with the road and is capable of maintaining thereby a uniform driving surface without any particular undue strain.

While I have described the traction belt 3 as being formed of link-connected blocks with metal-protected faces and indentations provided for clearance and certain means for tensionally connecting the frame 7 to the vehicle chassis I do not wish to be limited to this particular form of belt as any conventional style may be used; or to this particular construction of connections as any suitable tensioning connection may be utilized.

From the foregoing description taken in connection with the accompanying drawing it will be manifest that a traction attachment for motor vehicles is provided which will fulfill all the necessary requirements of such a device, and it should be understood in this connection that various minor changes in the details of construction may be resorted to within the scope of the appended claim without departing from the spirit or sacrificing any of the advantages of the invention.

What I claim as new is:

The combination with the chassis of a motor vehicle including front and rear axles, of an auxiliary chassis comprising longitudinal side members, pivotally connected intermediate their ends to the underside of the rear axle, an axle adjustably connected to the outer ends of said side members, idlers mounted on the ends of said last mentioned axle, traction chains trained around said idlers and driven by the rear vehicle axle, and a contractable tension spring having one end connected to the main chassis and its opposite end connected to the free inner ends of the side members of the auxiliary chassis, normally retaining said traction chains in engagement with the ground.

In testimony whereof I affix my signature.

GERHARD HAROLD FAST.